United States Patent [19]

Phipps

[11] Patent Number: 5,067,689
[45] Date of Patent: Nov. 26, 1991

[54] TRANSMISSION DRAIN PLUG

[76] Inventor: Harry C. Phipps, 504 Old State Rd., Pevely, Mo. 63070

[21] Appl. No.: 652,988

[22] Filed: Feb. 8, 1991

[51] Int. Cl.⁵ .................... F16K 51/00; B65D 41/04
[52] U.S. Cl. .................................. 251/144; 222/543; 137/351
[58] Field of Search .................. 251/144, 143, 218; 137/315, 351; 285/195, 42, 924; 222/543; 220/375

[56] References Cited

U.S. PATENT DOCUMENTS

| | | | |
|---|---|---|---|
| 3,049,334 | 8/1962 | Montague | 251/144 X |
| 3,103,947 | 9/1963 | Mueller | 251/144 X |
| 4,150,809 | 4/1979 | Muller | 137/351 |
| 4,361,310 | 11/1982 | Cummins | 251/144 |

Primary Examiner—Martin P. Schwadron
Assistant Examiner—Kevin Lee

[57] ABSTRACT

A plug for draining fluids from a vehicle transmission fluid pan is described that has an externally threaded tubular valve placed through a port in the transmission fluid pan. The tubular valve is placed through a port in the transmission fluid pan and held in place on the transmission fluid pan by a bolt head on one end of the tubular valve and an internally threaded lock nut screwed onto threads on the outer surface of the tubular valve. There is a seal on the tubular valve between the bolt head and the transmission fluid pan and a seal in the end cap to reduce leakage from the port and the tubular valve. An end cap is threadingly placed on another end of the tubular valve distal the bolt head to selectively allow flow of lubricant through the tubular valve from the transmission fluid pan. There is a retaining spring strap having a loop on one end through which the tubular valve is placed. The other end of the strap is rotatively connected to the end cap to spring and suspend the end cap away from the tubular valve and out of the flow stream of the lubricant flowing from the pan and to keep the end cap from falling into a transmission fluid receptacle or onto the surface below.

3 Claims, 1 Drawing Sheet

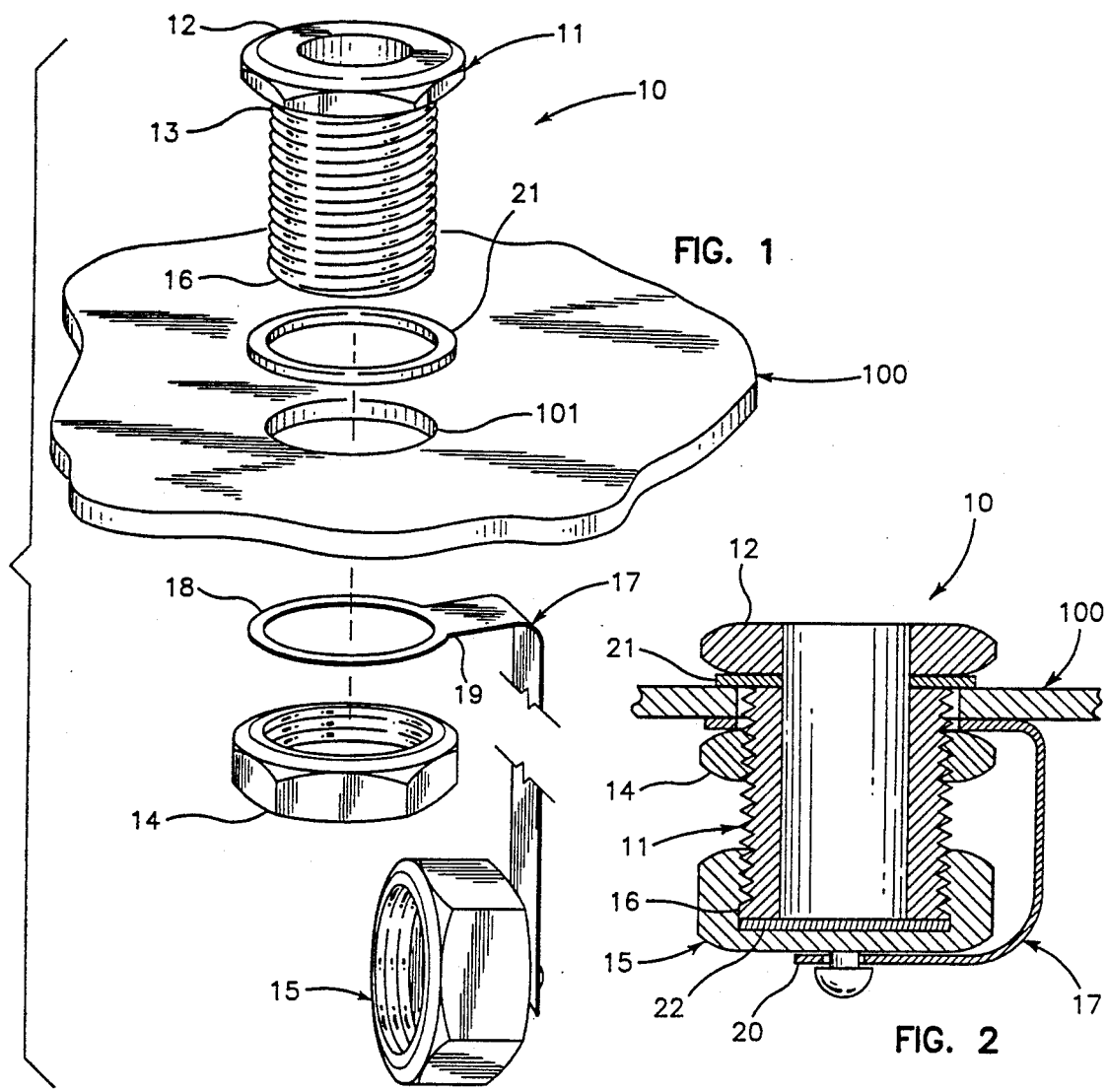
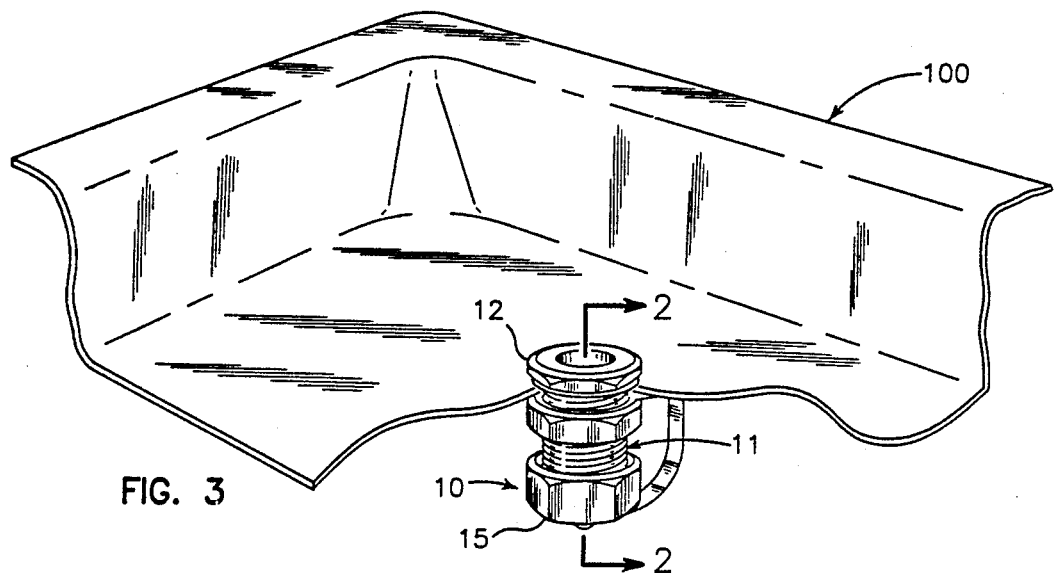

TRANSMISSION DRAIN PLUG

BACKGROUND OF THE INVENTION

1. Field of the Invention

The present invention avoids the mess that may be created by attempting to drain the transmission fluid from a transmission fluid reservoir pan when the cap portion of the drain plug falls into the receptacle provided to catch the transmission fluid. It does this by suspending the portion that allows the transmission fluid to flow from the plug. Also some transmission pans do not have a drain plug. To drain the transmission fluid from such an arrangement, the pan must be removed and then replaced. If the transmission fluid pan does not already have a valve port therein, a port may be made in the pan and the present plug placed therein eliminating the need to remove the pan each time to drain the lubricant therefrom.

2. Description of the Related Art

U.S Pat. No. 3,049,334 to H. Montague on Aug. 14, 1962 shows an automatic crankcase drain attachment that utilizes a long wrench to turn a side valve apparatus so that the user does not have to crawl under the vehicle.

U.S. Pat. No. 4,150,809 to H. Muller on Apr. 24, 1979 describes a valve device for draining liquids that has a pressing sleeve that when depressed allows transmission fluid to flow through the valve.

U.S. Pat. No. 4,361,310 to J. W. Cummins on Nov. 30, 1982 shows a quick release drain plug that has a resilient compressible plug held in sealing engagement with a valve and locked in place with a cam fastener and a lock pin.

SUMMARY OF THE INVENTION

In most instances, vehicular transmission fluid pans are not provided with a valve, referred to as a drain plug, to allow lubricant to be drained from the pan. Often when removing the portion that allows flow of fluid through the plug, that portion falls into the receptacle placed beneath it to receive the fluid. This may cause fluid to splash out of the receptacle or cause the user to dip his hand into the fluid in the receptacle to retrieve the portion that fell therein. This is a messy situation to say the least. The invention described below solves these problems by providing a plug that springs the plug cap out of the way while suspending the cap. The tubular plug may be retrofitted on pans without drain ports or used to replace standard drain plugs on pans of new or used vehicles or power plants.

A plug for draining fluids from a vehicle transmission fluid pan or reservoir is described herein that has an externally threaded tubular valve placed through a port in the transmission fluid pan. There is a bolt head, on one end of the tubular valve, and an internally threaded lock nut, threadingly placed on the tubular valve, to secure the tubular valve to the transmission fluid pan. An internally threaded end cap is threadingly placed on another end of the tubular valve distal the bolt head to seal and unseal the other end of the tubular valve. There is a retaining spring strap having a loop on one end through which the tubular valve is placed. Another end of the strap is rotatively connected to the end cap to suspend the end cap away from the tubular valve.

The tubular valve may also have a first seal on the tubular valve between the bolt head and the transmission fluid pan and a second seal in the end cap.

It is an object of this invention to provide a drain plug apparatus that reduces the chance of losing the end cap and/or creating a mess when draining the lubricant from an transmission fluid pan.

It is another object of this invention to provide a drain plug apparatus that replaces a standard transmission fluid plug or can be used, after a port is placed therein, in a pan that did not previously have a drain plug to eliminate the need to remove the pan every time the lubricant needs to be replaced.

BRIEF DESCRIPTION OF THE DRAWINGS

FIG. 1 is a exploded perspective of the plug for draining fluids from an vehicle transmission fluid pan showing the plug placed in a partial section of an transmission fluid pan.

FIG. 2 is a cross-section of the plug taken along lines 2—2 of FIG. 3.

FIG. 3 is a perspective view of the plug shown in place in a partial section of the transmission fluid pan.

DESCRIPTION OF THE PREFERRED EMBODIMENT

In FIGS. 1 through 3, a plug 10 for draining fluids from a vehicle transmission fluid pan 100 is shown. If the transmission fluid pan 100 does not have a port 101 through which the plug 10 can be placed, a port 101 must be made in the pan 100.

There is a externally threaded tubular valve 11 placed through a port 101 in the transmission fluid pan 100. There is a bolt head 12 on one end 13 of the tubular valve 11. An internally threaded lock nut 14 is threadingly placed on the tubular valve 11 to secure the tubular valve 11 to the transmission fluid pan. There is an internally threaded end cap 15 threadingly placed on another end 16 of the valve 11 distal the bolt head 12 to seal and unseal the other end 16 of the valve 11.

A retaining spring strap 17 has a loop 18 on one end 19 through which the tubular valve 11 is placed. There is another end 20 of the strap 17 that is rotatively connected to the end cap 15 to suspend the end cap 15 away from the tubular valve 11. A first seal 21 is placed on the tubular valve 11 between the bolt head 12 and the transmission fluid pan 100. There is, also, a second seal 22 in the end cap 15.

The foregoing descriptions and drawings of the invention are explanatory and illustrative only, and various changes in shape, sizes and arrangements of parts as well certain details of the illustrated construction may be made within the scope of the appended claims without departing from the true spirit of the invention.

I claim:

1. A plug for draining fluids from a vehicle transmission fluid pan comprising:
   a. an externally threaded tubular valve placed through a port in the transmission fluid pan;
   b. a bolt head on one end of the tubular valve;
   c. an internally threaded lock nut threadingly placed on the tubular valve to secure the tubular valve to the transmission fluid pan;
   d. an internally threaded end cap threadingly placed on another end of the tubular valve distal the bolt head to seal and unseal the other end of the tubular valve;

e. a retaining spring strap having a loop on one end through which the tubular valve is placed; and f. another end of the strap being rotatively connected to the end cap to suspend the end cap away from the tubular valve.

2. A plug as described in claim 1 further comprising:

a. a first seal on the tubular valve between the bolt head and the transmission fluid pan; and b. a second seal in the end cap.

3. A valve for draining fluids from a vehicle transmission fluid pan comprising:

a. an externally threaded tubular valve placed through a port in the transmission fluid pan;

b. a bolt head on one end of the tubular valve;

c. an internally threaded lock nut threadingly placed on the tubular valve to secure the tubular valve to the transmission fluid pan;

d. an internally threaded end cap threadingly placed on another end of the tubular valve distal the bolt head to seal and unseal the other end of the tubular valve;

e. a retaining spring strap having a loop on one end through which the tubular valve is placed;

f. another end of the strap being rotatively connected to the end cap to suspend the end cap away from the tubular valve;

g. a first seal on the tubular valve between the bolt head and the transmission fluid pan; and h. a second seal in the end cap.

* * * * *